US012679670B2

(12) United States Patent　　(10) Patent No.: US 12,679,670 B2
Oka et al.　　(45) Date of Patent: Jul. 14, 2026

(54) HANDLING SYSTEM, CONTROL DEVICE, AND CONTROL METHOD

(71) Applicant: Kabushiki Kaisha Toshiba, Tokyo (JP)

(72) Inventors: Yoshifumi Oka, Yokohama (JP); Seiji Tokura, Kawasaki (JP); Akihito Ogawa, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 18/524,889

(22) Filed: Nov. 30, 2023

(65) Prior Publication Data

US 2024/0190667 A1　Jun. 13, 2024

(30) Foreign Application Priority Data

Dec. 8, 2022　(JP) ................................ 2022-196577

(51) Int. Cl.
　　*B25J 9/16*　　(2006.01)
　　*B65G 47/90*　　(2006.01)
(52) U.S. Cl.
　　CPC .......... *B65G 47/905* (2013.01); *B25J 9/1697* (2013.01)
(58) Field of Classification Search
　　USPC ................................................. 700/245–264
　　See application file for complete search history.

(56) References Cited

U.S. PATENT DOCUMENTS

| | | | | |
|---|---|---|---|---|
| 9,802,317 | B1 * | 10/2017 | Watts .................... | G05B 19/402 |
| 10,696,494 | B1 * | 6/2020 | Diankov ................ | B65G 57/00 |
| 10,958,895 | B1 * | 3/2021 | Krishnan Gorumkonda ............... | |
| | | | | H04N 13/246 |
| 12,064,886 | B1 * | 8/2024 | Terhuja .................. | B25J 9/1684 |
| 2006/0111811 | A1 * | 5/2006 | Okamoto .............. | B25J 9/0003 |
| | | | | 700/214 |
| 2006/0112034 | A1 * | 5/2006 | Okamoto ............. | G05D 1/0255 |
| | | | | 706/16 |

(Continued)

FOREIGN PATENT DOCUMENTS

| | | | |
|---|---|---|---|
| JP | 4784823 | B2 | 10/2011 |
| JP | 2019-028775 | A | 2/2019 |

(Continued)

*Primary Examiner* — Jonathan L Sample

(74) *Attorney, Agent, or Firm* — Oblon, McClelland, Maier & Neustadt, L.L.P.

(57)　　　　　ABSTRACT

A handling system according to an embodiment includes: a handling device configured to transfer an object from a transfer source space to a transfer destination space with the object gripped; a transfer destination measuring device configured to measure a transfer destination shape that is a shape of the transfer destination space; and a control device configured to control the handling device and the transfer destination measuring device. The control device described above records a measurement history of the transfer destination shapes acquired from the transfer destination measuring device and a calculation history of placement positions of the objects transferred to the transfer destination space and generates a complemented transfer destination shape acquired by complementing the transfer destination shape on the basis of the measurement history of the transfer destination shapes and the calculation history of the placement positions.

15 Claims, 11 Drawing Sheets

(56)                References Cited

U.S. PATENT DOCUMENTS

| | | | | |
|---|---|---|---|---|
| 2011/0235054 A1* | 9/2011 | Koike | B25J 9/1697 | |
| | | | 356/620 | |
| 2013/0104506 A1* | 5/2013 | Renner | B65B 35/24 | |
| | | | 53/235 | |
| 2016/0283792 A1* | 9/2016 | Okazaki | G06V 10/42 | |
| 2019/0111454 A1* | 4/2019 | Sezaki | B07C 5/12 | |
| 2019/0355144 A1* | 11/2019 | Korobov | G06T 7/11 | |
| 2020/0078941 A1* | 3/2020 | Oka | B25J 9/1653 | |
| 2020/0148489 A1 | 5/2020 | Diankov et al. | | |
| 2020/0238519 A1* | 7/2020 | Diankov | B25J 9/1697 | |
| 2020/0269429 A1* | 8/2020 | Chavez | B25J 9/1687 | |
| 2020/0302391 A1* | 9/2020 | Li | G06Q 10/0875 | |
| 2020/0391385 A1* | 12/2020 | Oka | B25J 9/1666 | |
| 2021/0053216 A1* | 2/2021 | Diankov | B25J 9/1669 | |
| 2021/0097709 A1* | 4/2021 | Edwards | H04N 5/38 | |
| 2021/0209781 A1 | 7/2021 | Diankov et al. | | |
| 2022/0135347 A1* | 5/2022 | Cohen | B65G 47/917 | |
| | | | 700/245 | |
| 2022/0402134 A1* | 12/2022 | Pidaparthi | B25J 9/1671 | |
| 2023/0070495 A1* | 3/2023 | Lertkultanon | B65G 47/918 | |
| 2023/0109294 A1* | 4/2023 | Kim | B25J 13/06 | |
| | | | 700/253 | |
| 2023/0158677 A1* | 5/2023 | Tsutsui | B65G 57/03 | |
| | | | 700/246 | |
| 2025/0229420 A1* | 7/2025 | Menon | B25J 9/162 | |

FOREIGN PATENT DOCUMENTS

| | | |
|---|---|---|
| JP | 2019-126866 A | 8/2019 |
| JP | 6577687 B1 | 9/2019 |
| JP | 2020-040158 A | 3/2020 |
| JP | 2020-187528 A | 11/2020 |
| JP | 2020-203342 A | 12/2020 |

* cited by examiner

FIG. 3

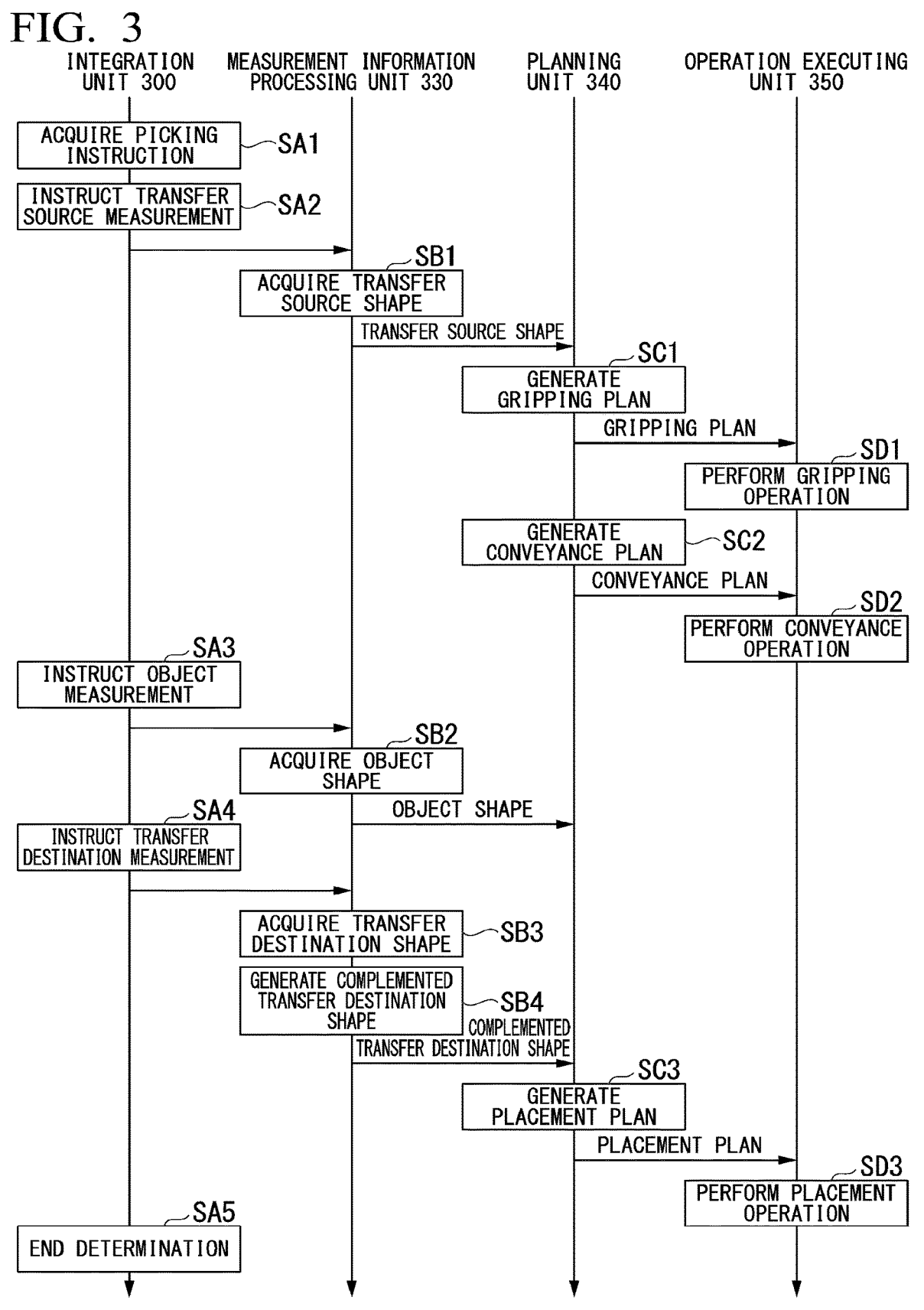

| INTEGRATION UNIT 300 | MEASUREMENT INFORMATION PROCESSING UNIT 330 | PLANNING UNIT 340 | OPERATION EXECUTING UNIT 350 |
|---|---|---|---|

ACQUIRE PICKING INSTRUCTION — SA1

INSTRUCT TRANSFER SOURCE MEASUREMENT — SA2

SB1
ACQUIRE TRANSFER SOURCE SHAPE

TRANSFER SOURCE SHAPE

SC1
GENERATE GRIPPING PLAN

GRIPPING PLAN

SD1
PERFORM GRIPPING OPERATION

GENERATE CONVEYANCE PLAN — SC2

CONVEYANCE PLAN

SD2
PERFORM CONVEYANCE OPERATION

SA3
INSTRUCT OBJECT MEASUREMENT

SB2
ACQUIRE OBJECT SHAPE

SA4
INSTRUCT TRANSFER DESTINATION MEASUREMENT

OBJECT SHAPE

ACQUIRE TRANSFER DESTINATION SHAPE — SB3

GENERATE COMPLEMENTED TRANSFER DESTINATION SHAPE — SB4

COMPLEMENTED TRANSFER DESTINATION SHAPE

SC3
GENERATE PLACEMENT PLAN

PLACEMENT PLAN

SD3
PERFORM PLACEMENT OPERATION

SA5
END DETERMINATION

HANDLING SYSTEM, CONTROL DEVICE, AND CONTROL METHOD

CROSS-REFERENCE TO RELATED APPLICATION

This application is based upon and claims the benefit of priority from Japanese Patent Application No. 2022-196577, filed Dec. 8, 2022; the entire contents of (all of) which are incorporated herein by reference.

FIELD

Embodiments described herein relate generally to a handling system, a control device, a control method, and a control program.

BACKGROUND

Conventionally, a handling system that takes out an object such as a product or the like housed in a transfer source container and transfers the taken-out object to a transfer destination container is known. A handling system calculates a placement position and the like of an object using three-dimensional information of a container or the like acquired using a three-dimensional camera or the like.

BRIEF DESCRIPTION OF THE DRAWINGS

FIG. 3 is a sequence diagram of the handling system.

DETAILED DESCRIPTION

Hereinafter, a handling system, a control device, a control method, and a control program according to embodiments will be described with reference to the drawings. In the following description, the same reference sign will be assigned to components having the same function or functions similar to each other. Duplicate description of such components may be omitted. In addition, "based on XX" in this application means "based on at least XX" and includes a case of on the basis of other elements in addition to XX. Furthermore, "based on XX" is not limited to a case in which XX is directly used and also includes a case of being based on a result of performing an arithmetic operation or processing on XX. Here, "XX" is an arbitrary element (for example, arbitrary information).

First Embodiment

Figure 1:
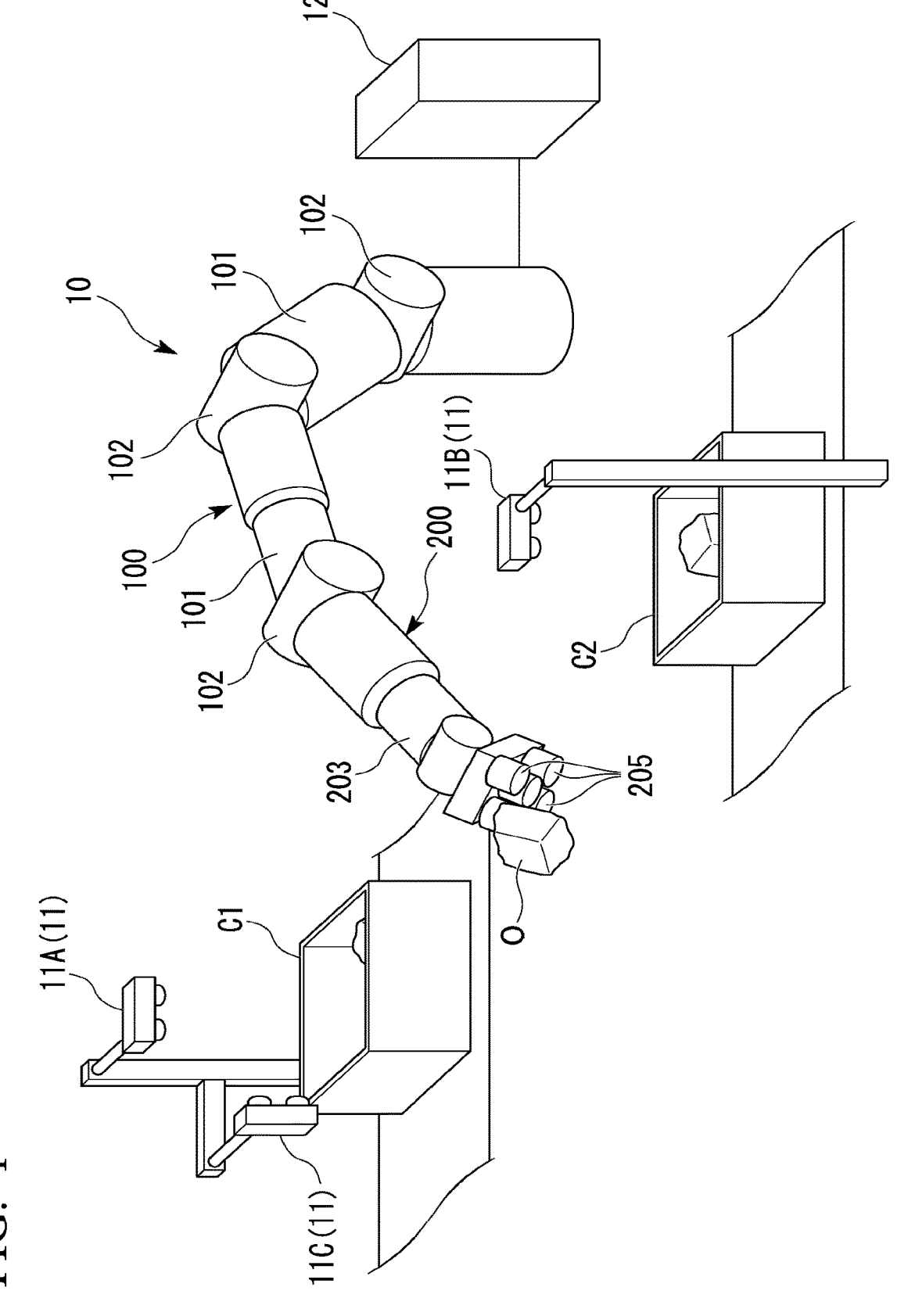
FIG. 1 is a perspective view schematically illustrating a handling system according to a first embodiment.

A first embodiment will be described with reference to FIGS. 1 to 18. FIG. 1 is a perspective view schematically illustrating a handling system 1 according to this embodiment.

[Handling System 1]

For example, the handling system 1 is a handling system (picking system) used for physical distribution. The handling system 1 transfers an object (storage target object; a transfer target object) O positioned in a transfer source C1 to a transfer destination C2.

The transfer source C1, for example, is any one of various conveyers, containers such as a pallet, a tote, a collapsible container, and a bin, and the like. Here, the "container" broadly represents a member (for example, a member having a box shape) that can house an object O. However, the transfer source C1 is not limited to the example given above. In the following description, the "transfer source C1" may be referred to as a "transfer source container C1".

In the transfer source C1, a plurality of types of objects O of which sizes and weights are different from each other are randomly placed. For example, an object O of a storage target has a concave-convex shape in at least a part of the surface of the object O. In this embodiment, there are various exterior shapes of the object O from a shape of 5 cm in height to a shape of 30 cm in height. In addition, there are various types of object O from an object having a light weight of several tens of g to an object having a heavy weight of several kg. Here, the size and the weight of the object O are not limited to the examples described above.

For example, the transfer destination C2 is any one of various conveyers, containers such as a pallet, a tote, a collapsible container, and a bin, and the like. However, the transfer destination C2 is not limited to the examples described above. In the following description, the "transfer destination C2" may be referred to as a "transfer destination container C2", and the "transfer source C1" and the "transfer destination C2" may be collectively referred to as a "container". In addition, the handling system 1 may move an object O to a transfer destination C2 other than a container.

The handling system 1 is not limited to a handling system for physical distribution. The handling system 1 can be broadly applied to an industrial robot system, other systems, and the like. A "handling system" and a "handling device" described here are not limited to a system and a device used for conveyance of an object as its main objective and also include a system and a device accompanying conveyance (movement) of an object as a part of product assembly or other objectives.

As illustrated in FIG. 1, the handling system 1 includes a handling device 10, a measuring device 11 and a control device 12. The control device 12 may be built into the handling device 10.

For example, the handling device 10 is a robot device. The handling device 10 holds an object O positioned in a transfer source container C1 and moves the held object O to a transfer destination container C2 (a storage area). The handling device 10 can communicate with the control device 12 in a wired or wireless manner.

The handling device 10, for example, includes an arm 100 and a holding part 200 disposed at a tip end of the arm 100.

The arm 100 is a movement mechanism that moves the holding part 200 to a desired position. For example, the arm 100 is a 6-axis vertical articulated robot arm. The arm 100 can take various positions/postures. Similar to an arm and a hand of a person, the arm 100 can take various postures for holding an object as well. The arm 100, for example, includes a plurality of arm members 101 and a plurality of rotation parts 102 connecting the plurality of arm members 101 to be rotatable.

The arm 100 may be a 3-axis orthogonal robot arm. The arm 100 may be a mechanism that moves the holding part 200 to a desired position using another component. For example, the arm 100 may be a flying body (for example, a drone) that raises the holding part 200 using a rotor blade and moves it.

The holding part 200 is a holding mechanism (end effector) that holds an object O positioned in the transfer source container C1. For example, the holding part 200 has a suction device 203 and an adsorption part 205 that communicates with the suction device 203. The holding part 200 is an adsorption-type hand that holds an object O through adsorption.

The suction device 203, for example, is a vacuum pump. The suction device 203 communicates with a plurality of adsorption parts 205 though hoses and the like. By driving the suction device 203, the pressure of the inside of each adsorption part 205 becomes lower than an aspheric atmosphere, and an object O is adsorbed and held by the adsorption part 205.

A plurality of adsorption parts 205 are disposed at a tip end of the holding part 200. The adsorption part 205 has an outer shape smaller than a smallest object O positioned in the transfer source container C1. The handling device 10 adsorbs and holds an object O using only one or more adsorption parts 205 selected from the plurality of adsorption parts 205.

The holding part 200 may be a mechanism that holds an object O using any other holding method. For example, the holding part 200 may be a holding part that is able to pinch an object O using a pinching mechanism. For example, the holding part 200 may be a holding part that is able to hold an object O using a magnetic force. For example, the holding part 200 may be a holding part (for example, a jamming gripper) that is configured using a flexible membrane containing powder and a vacuum pump extracting air from the inside of the flexible membrane and is able to hold an object O using a jamming phenomenon.

The measuring device 11 is able to measure shapes of an object O and a container by being controlled by the control device 12. The measuring device 11 includes a transfer source measuring device 11A, a transfer destination measuring device 11B, and an object measuring device 11C. The transfer source measuring device 11A, the transfer destination measuring device 11B, and the object measuring device 11C are connected to the control device 12 in a wired or wireless manner.

The transfer source measuring device 11A is a three-dimensional camera or the like disposed above the transfer source container C1 (for example, immediately above or obliquely above the transfer source container C1). The transfer source measuring device 11A acquires measurement data relating to a transfer source shape of a transfer source container C1 including an object O placed inside the transfer source container C1. The measurement data acquired by the transfer source measuring device 11A, for example, is "image data", "distance image data", "shape data", and the like. The "distance image data" is image data having distance information (for example, depth information from an arbitrary reference face set on an upper side of the transfer source C1) in one or more directions. The "shape data" is information representing external shapes and the like of a container and an object O. Measurement data acquired by the transfer source measuring device 11A is output to the control device 12. In addition, the transfer source measuring device 11A may be provided as a part of the handling device 10.

The transfer destination measuring device 11B is a three-dimensional camera or the like disposed on an upper side of the transfer destination container C2 (for example, a right upper side or an obliquely upper side of the transfer destination container C2). The transfer destination measuring device 11B acquires measurement data relating to a transfer destination shape of the transfer destination container C2 including an object O placed inside the transfer destination container C2. The measurement data acquired by the transfer destination measuring device 11B, for example, is "image data", "distance image data", "shape data", and the like. The "distance image data" is image data having distance information (for example, depth information from an arbitrary reference face set on an upper side of the transfer destination C2) of one or more directions. The "shape data" is information representing external shapes and the like of the transfer destination container C2 and an object O. The measurement data acquired by the transfer destination measuring device 11B is output to the control device 12. In addition, the transfer destination measuring device 11B may be provided as a part of the handling device 10.

The object measuring device 11C is a three-dimensional camera or the like disposed near the transfer source container C1 and is disposed at a position at which an object O taken out from the transfer source container C1 can be measured. The object measuring device 11C acquires measurement data relating to an object shape of the object O held in the handling device 10. The measurement data acquired by the object measuring device 11C, for example, is "image data", "distance image data", "shape data", and the like. The measurement data acquired by the object measuring device 11C is output to the control device 12.

The control device 12 performs management and control of the entire handling system 1. For example, the control device 12 acquires measurement data measured by the transfer source measuring device 11A, the transfer destination measuring device 11B, and the object measuring device 11C and controls the handling device 10 on the basis of the acquired measurement data. The control device 12, for example, is a program-executable device (computer) including a processor, a memory, a storage unit, and the like.

All or some of the functions of the control device 12 are realized, for example, by one or more processors such as a central processing unit (CPU) or a graphics processing unit (GPU) executing a control program stored in a program memory. Here, all or some of these functions may be realized by hardware (for example, a circuit unit; circuitry) such as a large scale integration (LSI), an application specific integrated circuit (ASIC), a field-programmable gate array (FPGA), a programmable logic device (PLD), or the like. In addition, all or some of the functions described above may be realized by software and hardware in combination. The storage unit is realized by a flash memory, an electrically erasable programmable read-only memory (EE-PROM), a read only memory (ROM), a random access memory (RAM), or the like.

Figure 2:
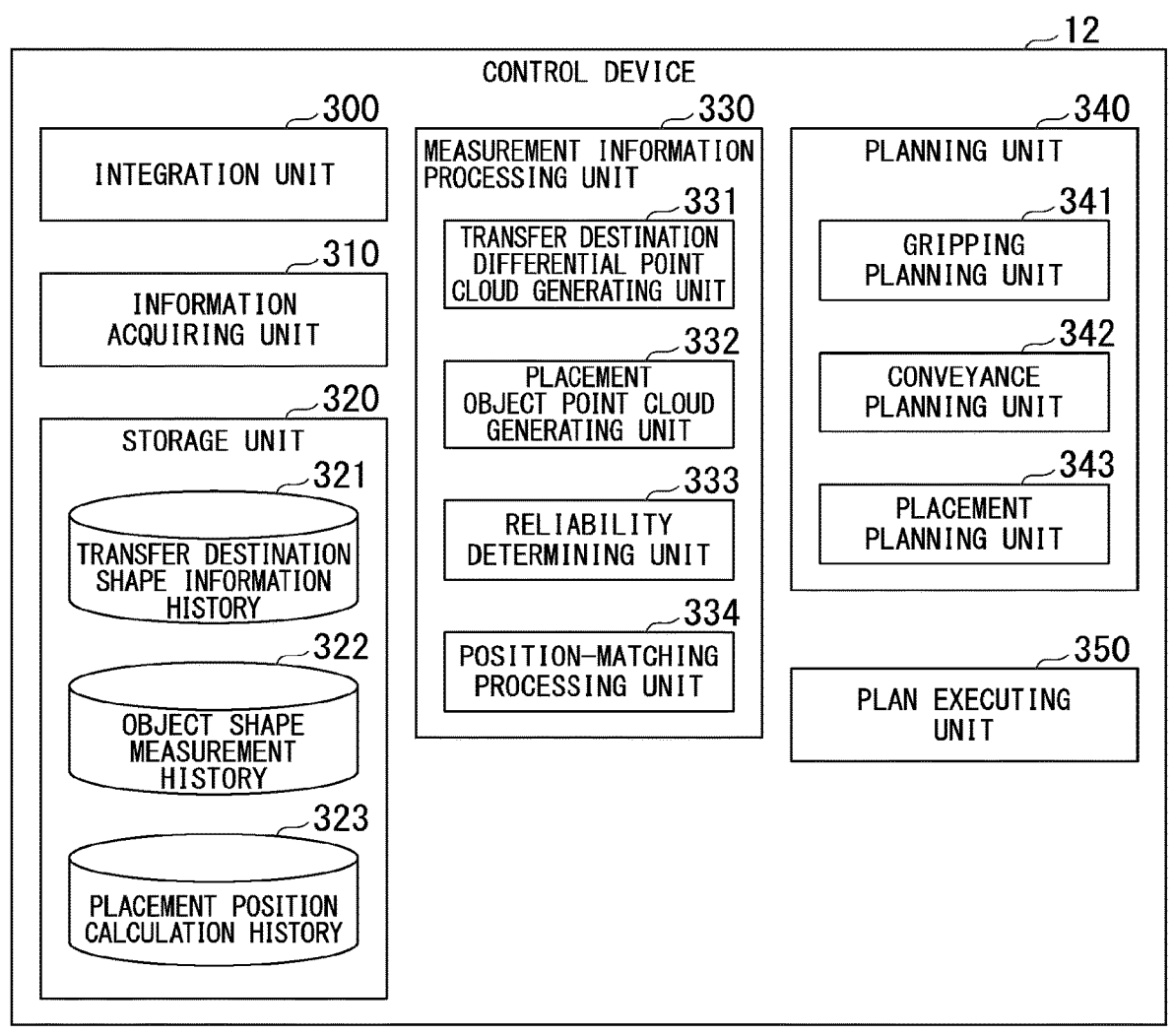
FIG. 2 is a functional block diagram of a control device of the handling system.

FIG. 2 is a functional block diagram of the control device 12.

The control device 12 includes an integration unit 300, an information acquiring unit 310, a recording unit 320, a measurement information processing unit 330, a planning unit 340, and a plan executing unit 350 as functional blocks.

The integration unit 300 controls, operates, and manages the handling system 1 by integrating functional blocks other than the integration unit 300.

The information acquiring unit 310 is an interface that is connected to the handling device 10, the measuring device 11, and other external devices in a wired or wireless manner. The functional blocks other than the information acquiring unit 310 is able to communicate with the handling device 10, the measuring device 11, and other external devices through the information acquiring unit 310.

The recording unit 320 records a transfer destination shape measurement history 321, an object shape measurement history 322, and a placement position calculation history 323.

The transfer destination shape measurement history 321 is a history of measurement data relating to a transfer destination shape of the transfer destination container C2 acquired from the transfer destination measuring device 11B. The transfer destination shape measurement history 321 may be a history of transfer destination shape data generated from measurement data relating to a transfer destination shape.

The object shape measurement history 322 is a history of measurement data relating to an object shape of an object O acquired from the object measuring device 11C. The object shape measurement history 322 may be a history of object shape data generated from measurement data relating to an object shape.

The placement position calculation history 323 is a history of placement position data of objects O that have been transferred to the transfer destination container C2. The placement position data used when an object O is transferred to the transfer destination container C2 by the handling device 10 is recorded for each transferred object O.

The measurement information processing unit 330 generates shape data based on information acquired from the measuring device 11. The measurement information processing unit 330 includes a transfer destination differential point cloud generating unit 331, a placement object point cloud generating unit 332, a reliability determining unit 333, and a position-matching processing unit 334. The transfer destination differential point cloud generating unit 331 generates a differential point cloud Q to be described below. The placement object point cloud generating unit 332 generates a placement object point cloud P to be described below. The reliability determining unit 333 assigns a degree of reliability to at least one of the placement object point cloud P and the differential point cloud Q. The position-matching processing unit 334 performs position matching of the placement object point cloud P with respect to the differential point cloud Q.

The planning unit 340 generates a plan relating to control of the handling device 10 on the basis of shape data and the like generated by the measurement information processing unit 330. The planning unit 340 includes a gripping planning unit 341 that generates a gripping plan, a conveyance planning unit 342 that generates a conveyance plan, and a placement planning unit 343 that generates a placement plan.

By controlling the handling device 10 on the basis of a plan generated by the planning unit 340, the plan executing unit 350 causes the handling device 10 to execute an operation based on the plan.

[Overview of Operation of Handling System 1]

Next, an overview of the operation of the handling system 1 will be described with reference to a sequence diagram of the handling system 1 illustrated in FIG. 3.

The integration unit 300 receives a picking instruction from a system of a higher rank or the like through the information acquiring unit 310 and starts a picking operation (Step SA1). The integration unit 300 starts a transfer operation of a first object O in accordance with the picking instruction.

The integration unit 300 instructs the transfer source measuring device 11A to measure the transfer source container C1 (Step SA2). The measurement information processing unit 330 acquires measurement data relating to a transfer source shape of the transfer source container C1 from the transfer source measuring device 11A (Step SB1). The measurement information processing unit 330 acquires a transfer source shape (also referred to as transfer source shape data) by performing a data process for measurement data relating to the transfer source shape acquired from the transfer source measuring device 11A as necessary.

The planning unit 340 generates a gripping plan and a conveyance plan including a gripping position and the like of an object O on the basis of a transfer source shape of a transfer source container C1 acquired by the measurement information processing unit 330 (Step SC1 and Step SC2). The plan executing unit 350 executes a gripping operation of an object O by controlling the handling device 10 on the basis of a gripping plan (Step SD1). Next, by controlling the handling device 10 on the basis of a conveyance plan, the plan executing unit 350 raises the object O and conveys it to the transfer destination container C2 (Step SD2).

The integration unit 300 instructs the object measuring device 11C to measure the object O gripped by the handling device 10 (Step SA3). The measurement information processing unit 330 acquires measurement data relating to an object shape of an object O from the object measuring device 11C (Step SB2). The measurement information processing unit 330 acquires an object shape (also referred to as object shape data) by performing a data process for the measurement data relating to the object shape acquired from the object measuring device 11C as necessary. In addition, in a case in which the object shape of the object O gripped by the handling device 10 is known, and data relating to the object shape of the object O is recorded in the recording unit 320, the handling system 1 may omit the process of acquiring measurement data relating to the object shape from the object measuring device 11C.

The integration unit 300 instructs the transfer destination measuring device 11B to measure the transfer destination container C2 (Step SA4). The measurement information processing unit 330 acquires measurement data relating to the transfer destination shape of the transfer destination container C2 from the transfer destination measuring device 11B (Step SB3). The measurement information processing unit 330 acquires a transfer destination shape (also referred to as transfer destination shape data) by performing a data process for measurement data relating to the transfer destination shape acquired from the transfer destination measuring device 11B as necessary.

The measurement information processing unit 330 generates a complemented transfer destination shape acquired by complementing a transfer destination shape on the basis of the transfer destination shape measurement history 321 and the placement position calculation history 323 (Step SB4).

The planning unit 340 generates a placement plan including a placement position of the object O on the basis of the complemented transfer destination shape generated by the measurement information processing unit 330 (Step SC3). By controlling the handling device 10 on the basis of the placement plan, the plan executing unit 350 executes a placement operation of the object O (Step SD3). After the placement operation is executed, the measurement information processing unit 330 stores the position of the object O that the handling device 10 has actually arranged as a placement position calculation history 323.

The integration unit 300 completes a picking operation by repeating such a process for all the products instructed in the picking instruction (Step SA5).

[Operation of Measurement Information Processing Unit 330]

Figure 4:
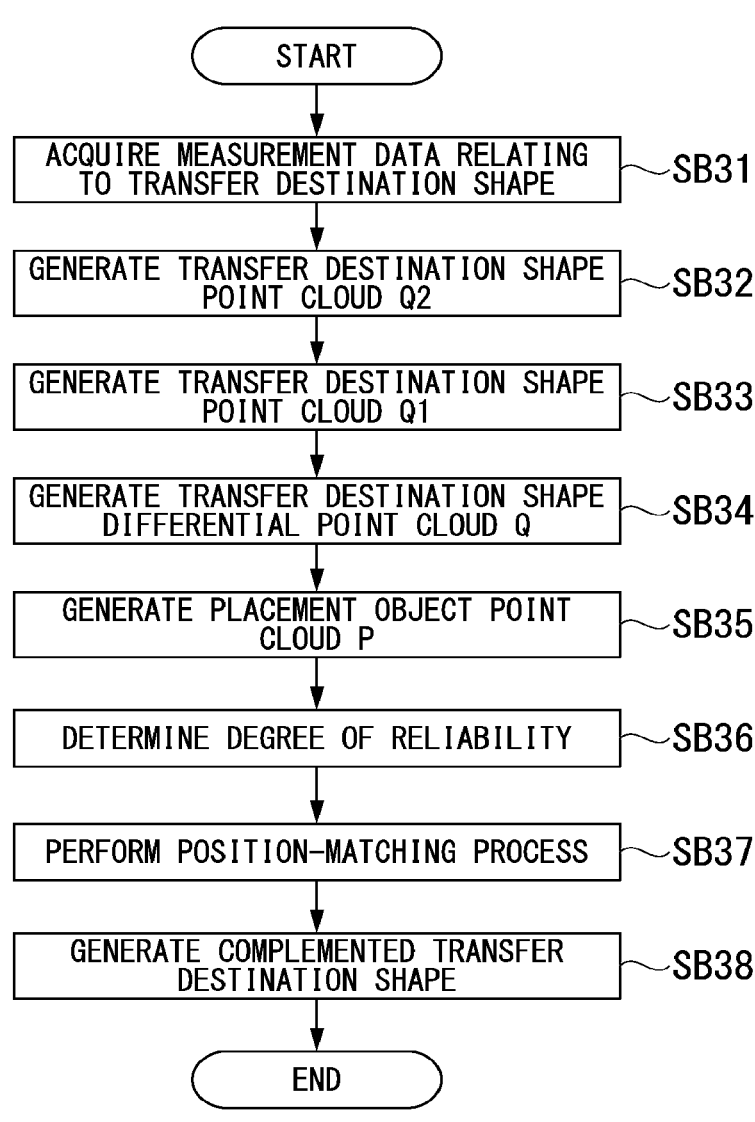
FIG. 4 is a control flowchart of a measurement information processing unit generating a complemented transfer destination shape.

Next, operation details of the measurement information processing unit 330 will be described. FIG. 4 is a control flowchart of the measurement information processing unit 330 generating a complemented transfer destination shape in a case in which a second object O2 is transferred after a first object O1 is transferred, and FIG. 3 is a detailed control flowchart of Steps SB3 and SB4 illustrated in FIG. 3.

Figure 5:
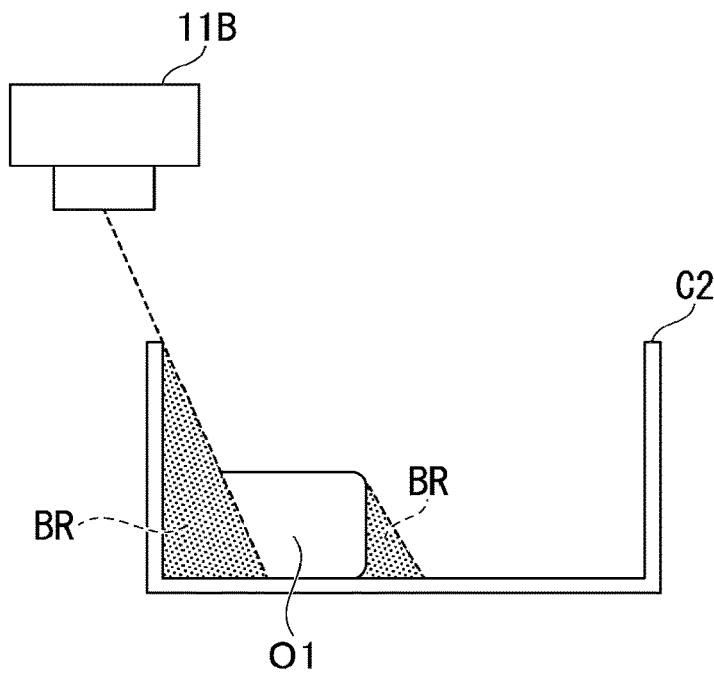
FIG. 5 is a diagram illustrating a transfer destination container.

FIG. 5 is a diagram illustrating a transfer destination container C2.

In Step SB31, the measurement information processing unit 330 acquires measurement data relating to a transfer destination shape of the transfer destination container C2 from a transfer destination measuring device 11B. In a case in which the transfer destination container C2 illustrated in FIG. 5 is measured, the measurement information processing unit 330 acquires measurement data relating to a transfer destination shape of the transfer destination container C2 including a first object O1 that is an object O that has been transferred. Here, in a case in which the shape of a container is measured by the measuring device 11, there are cases in which an area in which sensing according to generation of a blind spot or the like is insufficient is generated. For example, in a case in which the transfer destination container C2 is measured from an obliquely upper side of the transfer destination container C2 in accordance with restrictions of the placement position of the transfer destination measuring device 11B, a blind spot or the like is generated. The transfer destination measuring device 11B measuring the transfer destination container C2 illustrated in FIG. 5 measures the transfer destination container C2 from an obliquely upper side of the transfer destination container C2. For this reason, in measurement from the transfer destination measuring device 11B, a blind spot (a non-sensing area) BR is generated. The blind spot (a non-sensing area) BR includes an area generated in accordance with a side face of the transfer destination container C2 and an area generated in accordance with the first object O1. A part of the first object O1 of the transfer destination container C2 illustrated in FIG. 5 is included in the blind spot (a non-sensing area) BR generated in accordance with the side face of the container of the transfer destination container C2.

Figure 6:
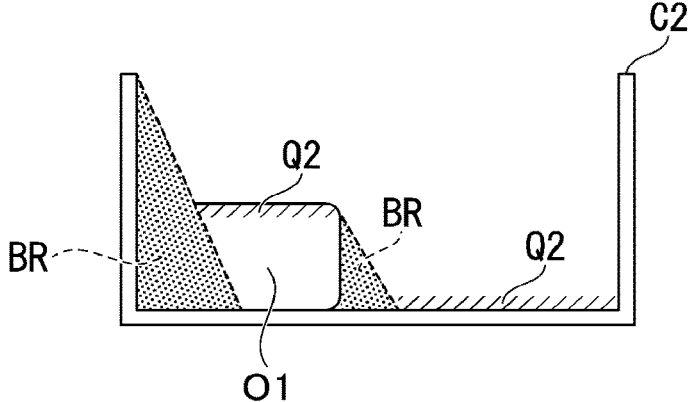
FIG. 6 is a diagram illustrating a point cloud of a transfer destination shape after transfer of a first object.

FIG. 6 is a diagram illustrating a point cloud Q2 of a transfer destination shape after transfer of a first object O1. The measurement information processing unit 330 generates a point cloud Q2 of a transfer destination shape after transfer of the first object O1 in Step SB32. The measurement information processing unit 330 generates a point cloud Q2 of a transfer destination shape from measurement data relating to a transfer destination shape using a known point cloud generation technique.

Figure 7:
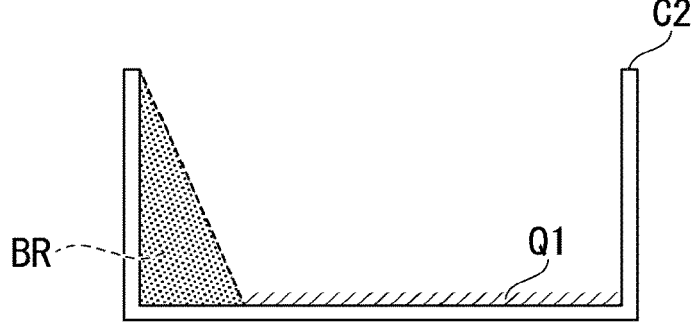
FIG. 7 is a diagram illustrating a point cloud of a transfer destination shape before transfer of a first object.

FIG. 7 is a diagram illustrating a point cloud Q1 of a transfer destination shape before transfer of a first object O1. In Step SB33, the measurement information processing unit 330 generates a point cloud Q1 of a transfer destination shape before transfer of the first object O1. More specifically, the measurement information processing unit 330 acquires measurement data relating to a transfer destination shape before transfer of a first object O1 from the transfer destination shape measurement history 321 and generates a point cloud Q1 of a transfer destination shape before transfer of the first object O1 using a known point cloud generation technique.

Figure 8:
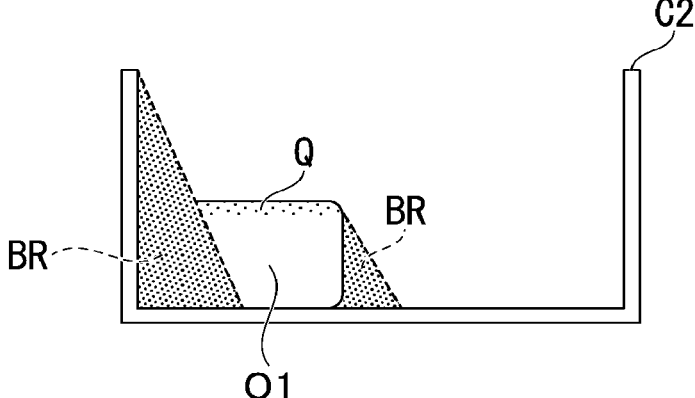
FIG. 8 is a diagram illustrating a differential point cloud of transfer destination shapes before and after transfer of a first object.

FIG. 8 is a diagram illustrating a differential point cloud Q of transfer destination shapes before and after transfer of a first object O1.

In Step SB34, the measurement information processing unit 330 generates a differential point cloud Q of transfer destination shapes before and after transfer of the first object O1. The measurement information processing unit 330 generates a differential point cloud Q of a transfer destination shape that is a difference between the point cloud Q2 of the transfer destination shape illustrated in FIG. 6 and the point cloud Q1 of the transfer destination shape illustrated in FIG. 7. The differential point cloud Q illustrates one example of a differential shape of transfer destination shapes before and after transfer of the first object O1 and thus can be regarded as a point cloud of the first object O1 that has been transferred.

Figure 9:
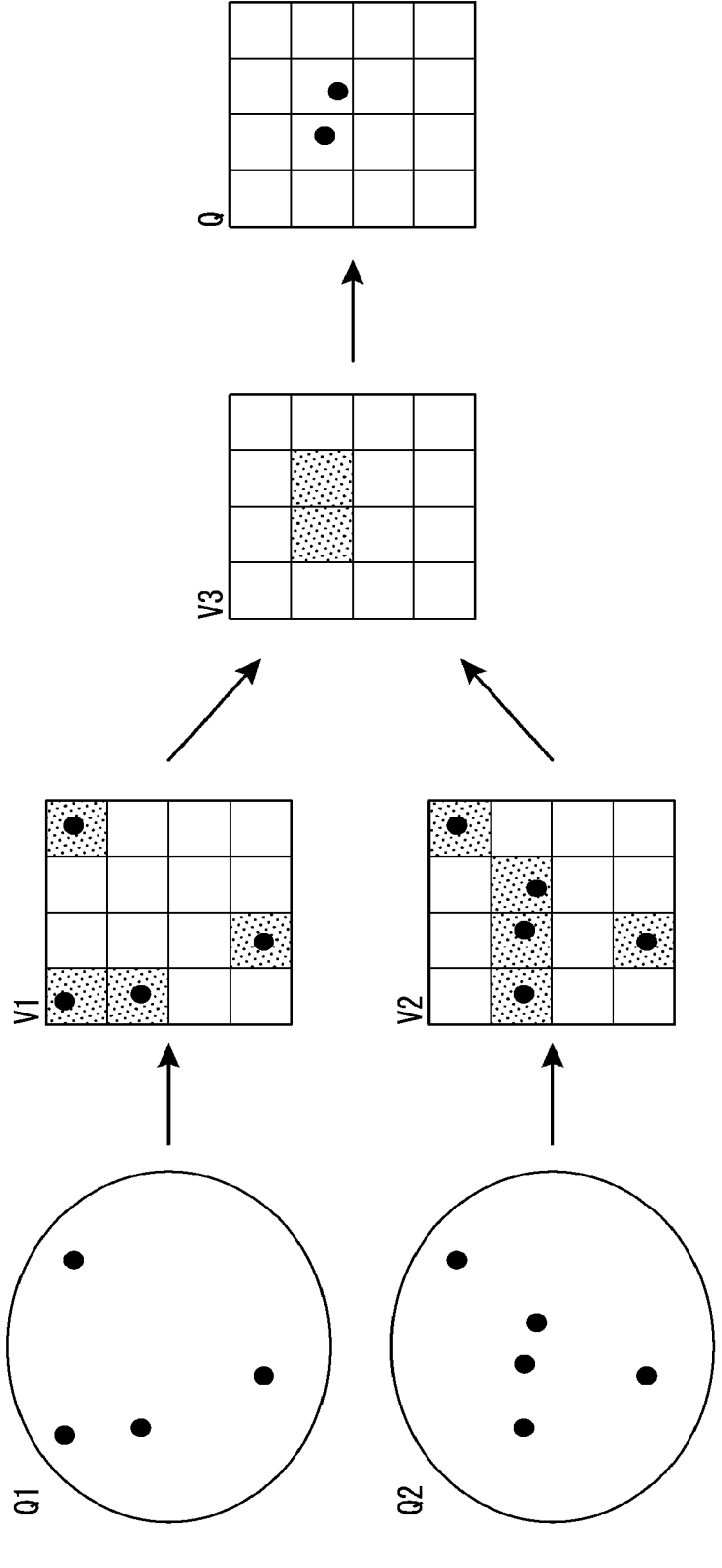
FIG. 9 is a diagram illustrating a method of generating the differential point cloud.

FIG. 9 is a diagram illustrating a method of generating the differential point cloud Q.

Figure 10:
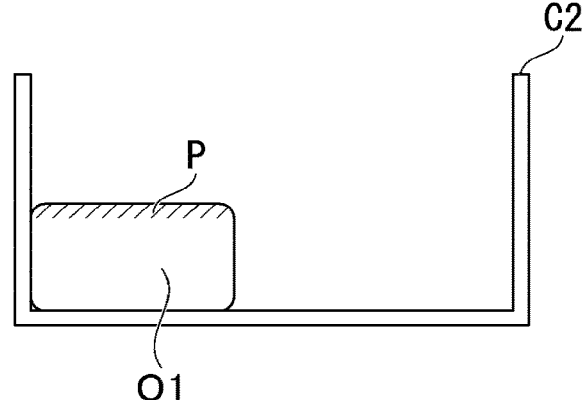
FIG. 10 is a diagram illustrating a placement object point cloud of a first object.

The measurement information processing unit 330, for example, divides a three-dimensional space of a transfer destination C2 into voxels having a predetermined size and assigns a label to a voxel in which each of point clouds Q1 and Q2 is included, thereby forming the point clouds as voxels. The measurement information processing unit 330 extracts voxels that are not present in a point cloud V1 acquired by forming a point cloud Q1 as a voxel and are present in a point cloud V2 acquired by forming a point cloud Q2 as a voxel and sets the extracted voxels as a voxel V3. Although a point cloud is a group of three-dimensional coordinates, and thus it is difficult to compare two point clouds by calculating a difference between the two point clouds, by forming point clouds as voxels, two point clouds can be easily compared with each other. By extracting only point clouds included in the voxel V3 from the point cloud Q2, the measurement information processing unit 330 can generate a differential point cloud Q. FIG. 10 is a diagram illustrating a placement object point cloud P of a first object O1.

In Step SB35, the measurement information processing unit 330 generates the placement object point cloud P of the first object O1. More specifically, the measurement information processing unit 330 acquires measurement data relating to an object shape of the first object O1 from the object shape measurement history 322 and acquires placement position data of the first object O1 from the placement position calculation history 323. The measurement information processing unit 330 generates a placement object point cloud P of the first object O1 that has been transferred to a transfer destination container C2 using a known point cloud generation technique on the basis of a transfer destination shape, measurement data relating to the object shape of the first object O1, and placement position data of the first object O1. The placement object point cloud P illustrates an example of a placement shape model of the transferred first object O1.

More specifically, the measurement information processing unit 330 generates a gripped object point cloud of the first object O1 that is in the state of being gripped by the handling device 10 from the measurement data relating to the object shape of the first object O1. A coordinate system of the gripped object point cloud is converted into a relative coordinate system with respect to the handling device 10. The measurement information processing unit 330 calculates a falling distance of the first object O1 from a position, at which the gripping of the first object is released, included in the placement position data of the first object O1. For example, the measurement information processing unit 330 forms the point cloud Q1 having the transfer destination shape and the gripped object point cloud as voxels and calculates a distance to a voxel of a point cloud Q1 having the transfer destination shape present in a right vertically downward direction from each voxel of the gripped object point cloud. The measurement information processing unit 330 calculates distances in the vertical direction for all the voxels of the gripped object point cloud and sets a minimum value of the distances as a falling distance. The measurement information processing unit 330 outputs a point cloud calculated by translating a gripped object point cloud at the time of releasing gripping to a right downward side by the fall distance as a placement object point cloud P.

Here, since the placement object point cloud P is generated on the basis of the placement position data used in a case in which the first object O1 is transferred to the transfer destination container C2, movement, deformation, and the like of the first object O1 after transfer of the first object O1 are not considered. In addition, in a placement shape model, measurement error in measurement data relating to an object shape of the first object O1 is not considered.

In Step SB36, the measurement information processing unit 330 assigns a degree of reliability ri to each point pi of a placement object point cloud P and assigns a degree of reliability si to each point qi of a differential point cloud Q. The measurement information processing unit 330 may assign a degree of reliability ri only to each point pi of a placement object point cloud P or may assign a degree of reliability si only to each point qi of a differential point cloud Q. The degree of reliability ri and the degree of reliability si, for example, may be fixed values, may be values calculated on the basis of a blind spot (a non-sensing area) BR, or may be values calculated on the basis of measurement accuracy of the measuring device 11.

Figure 11:
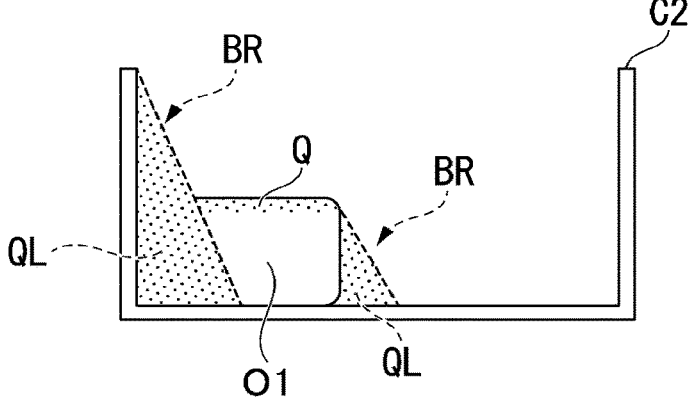
FIG. 11 is a diagram illustrating calculation of a degree of reliability based on a blind spot (a non-sensing area).

FIG. 11 is a diagram illustrating calculation of a degree of reliability based on a blind spot (a non-sensing area) BR. The measurement information processing unit 330, for example, assigns a high degree of reliability to points of a point cloud positioned at a position other than the blind spot (a non-sensing area) BR and assigns a low degree of reliability to points of a point cloud positioned at the blind spot (a non-sensing area) BR. A differential point cloud Q positioned at a position other than the blind spot (a non-sensing area) BR is a point cloud of which presence can be checked on the basis of measurement data that is actually measured by the measuring device 11. For this reason, the measurement information processing unit 330 assigns a high degree of reliability to the differential point cloud Q. On the other hand, a point cloud, which is positioned at the blind spot (a non-sensing area) BR, that has not been measured is a point cloud of which presence cannot be checked on the basis of measurement data that is actually measured by the measuring device 11 and is a point cloud of which the possibility of presence is not zero. For this reason, the measurement information processing unit 330 provisionally generates a point cloud (a partial shape that has not been measured) QL having a degree of reliability that is not zero and is lower than the degree of reliability assigned to the differential point cloud Q at the blind spot (a non-sensing area) BR.

Figure 12:
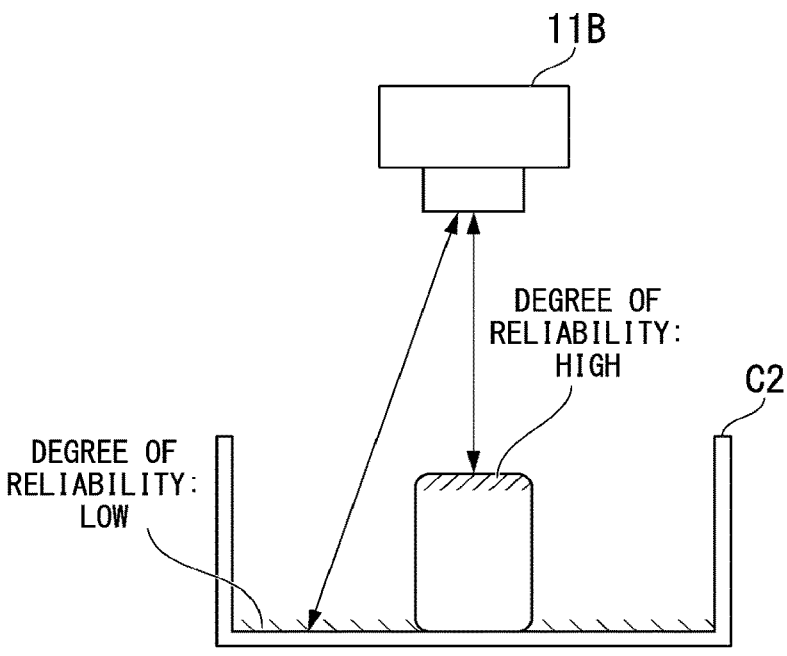
FIG. 12 is a diagram illustrating calculation of a degree of reliability based on a measurement distance.

FIG. 12 is a diagram illustrating calculation of a degree of reliability based on a measurement distance.

For example, the measurement information processing unit 330 assigns a high degree of reliability to points of a point cloud of which a measurement distance from the transfer destination measuring device 11B is short and assigns a low degree of reliability to points of a point cloud of which a measurement distance from the transfer destination measuring device 11B is long. The reason for this is that measurement accuracy of a point of a point cloud of which a measurement distance from the transfer destination measuring device 11B is long is lower than that of a point of a point cloud of which a measurement distance is short and thus is considered to have a low degree of reliability.

Figure 13:
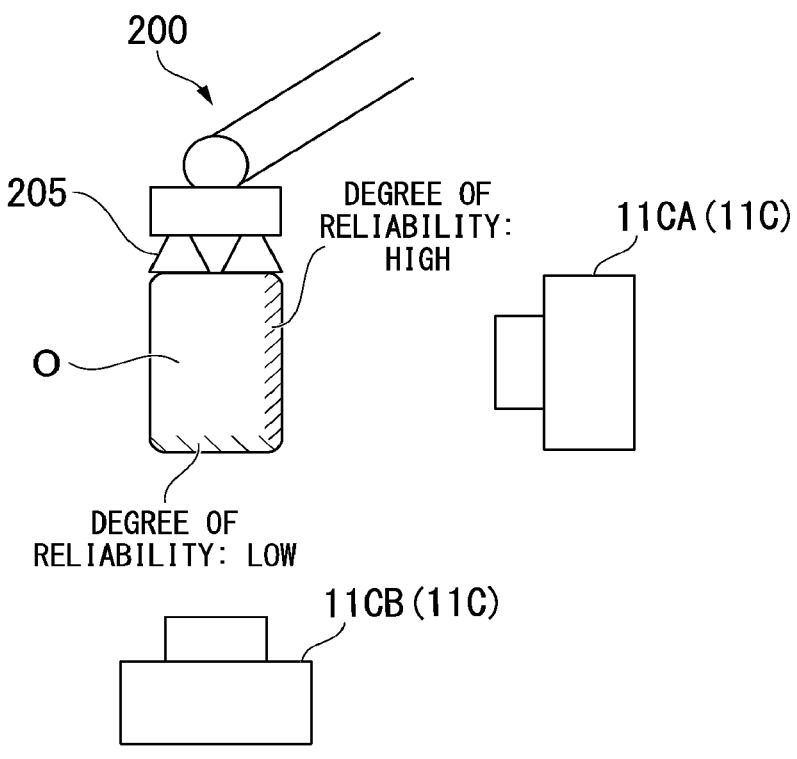
FIG. 13 is a diagram illustrating calculation of a degree of reliability based on a type of a measuring device.

FIG. 13 is a diagram illustrating calculation of a degree of reliability based on a type of a measuring device 11.

For example, in a case in which measurement data relating to an object shape of an object O is acquired using two object measuring devices 11C (an object measuring device 11CA and an object measuring device 11CB), the measurement information processing unit 330 calculates a degree of reliability on the basis of a type of the measuring device 11. The measurement information processing unit 330, for example, assigns a high degree of reliability to points of a point cloud based on measurement data of the object measuring device 11CA having high measurement accuracy and assigns a low degree of reliability to points of a point cloud based on measurement data of the object measuring device 11CB having low measurement accuracy.

Figure 14:
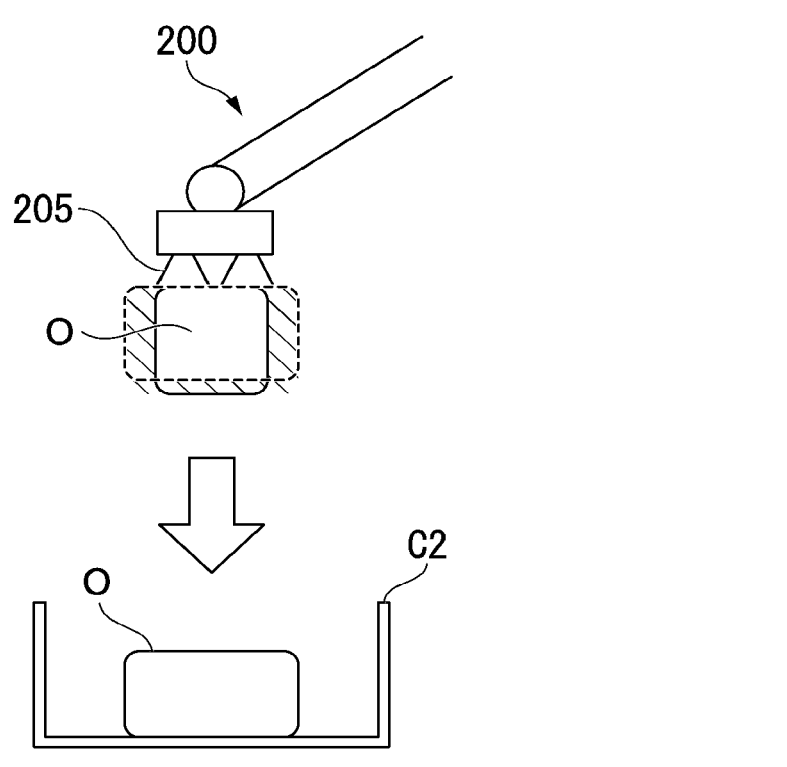
FIG. 14 is a diagram illustrating calculation of a degree of reliability with deformation of an object being taken into account.

FIG. 14 is a diagram illustrating calculation of a degree of reliability with deformation of an object O being taken into account.

For example, in a case in which the object O is a flexible object, and there is a high possibility of the shape of the object O changing after transfer, the measurement information processing unit 330 calculates a degree of reliability in accordance with a degree of easiness in deformation of the object O. The measurement information processing unit 330 may assign a degree of reliability in consideration of a deformation direction of the object O such that a length increases in a direction in which a height of the object O decreases and a horizontal direction of the object O.

The measurement information processing unit 330 performs position matching between a placement object point cloud P and a differential point cloud Q in Step SB37. The measurement information processing unit 330, for example, uses an ICP algorithm that is one of position-matching algorithms between point clouds. Hereinafter, position matching using the ICP algorithm will be described as an example.

For each point Pi of a placement object point cloud P, the measurement information processing unit 330 extracts a point qi that is the closest thereto in a differential point cloud Q and generates a pair {pi, qi} of the point of the placement object point cloud P and the point of the differential point cloud Q. On the basis of a degree of reliability assigned to the acquired pair {pi, qi} of the points, the measurement information processing unit 330 calculates a weight wi for the pair. For example, in a case in which assigned degrees of reliability are ri and si, the measurement information processing unit 330, as represented in Equation 1, calculates a weight wi as a product of the two degrees of reliability.

$$w_i = r_i s_i \qquad \text{(Equation 1)}$$

When a placement object point cloud P is moved in a rotation matrix R and a translation vector t with respect to each pair, the measurement information processing unit 330, as represented in Equation 2, calculates R and t minimizing a weighted sum of squares D of error with the differential point cloud Q.

$$D = \sum_{i=}^{n} w_i \|q_i - Rp_i - t\|^2 \qquad \text{(Equation 2)}$$

The translation vector t can be acquired by calculating centers of gravity including weights of the point clouds P and Q and moving the point clouds such that the centers are matched. As represented in Equation 3, the measurement information processing unit 330 calculates a center of gravity pc including the weight of the placement object point cloud P.

$$p_c = \frac{1}{n} \sum_{i=1}^{n} w_i p_i \qquad \text{(Equation 3)}$$

Similarly, as represented in Equation 4, the measurement information processing unit 330 calculates a center of gravity qc including the weight of the differential point cloud Q.

$$q_c = \frac{1}{n} \sum_{i=1}^{n} w_i q_i \qquad \text{(Equation 4)}$$

From these, as represented in Equation 5, the measurement information processing unit 330 calculates a translation vector t matching the centers of gravity.

$$t = q_c - p_c \qquad \text{(Equation 5)}$$

Subsequently, in order to calculate a rotation matrix R, the measurement information processing unit 330, as represented in Equation 6, calculates a covariance matrix K including the weight.

$$K = \frac{1}{n} \sum_{i=1}^{n} w_i p_i q_i \qquad \text{(Equation 6)}$$

Subsequently, as represented in Equation 7, the measurement information processing unit 330 performs singular value decomposition of the covariance matrix K and represents the covariance matrix K as products of orthogonal matrixes U and V and a diagonal matrix A.

$$K = U\Lambda V^T \qquad \text{(Equation 7)}$$

At this time, a rotation matrix R minimizing a weighted sum of squares of error is represented as illustrated in Equations 8 and 9.

$$R = U\Lambda' V^T \qquad \text{(Equation 8)}$$

$$\Lambda' = \begin{pmatrix} 1 & 0 & 0 \\ 0 & 1 & 0 \\ 0 & 0 & \det[VU^T] \end{pmatrix} \qquad \text{(Equation 9)}$$

Figure 15:
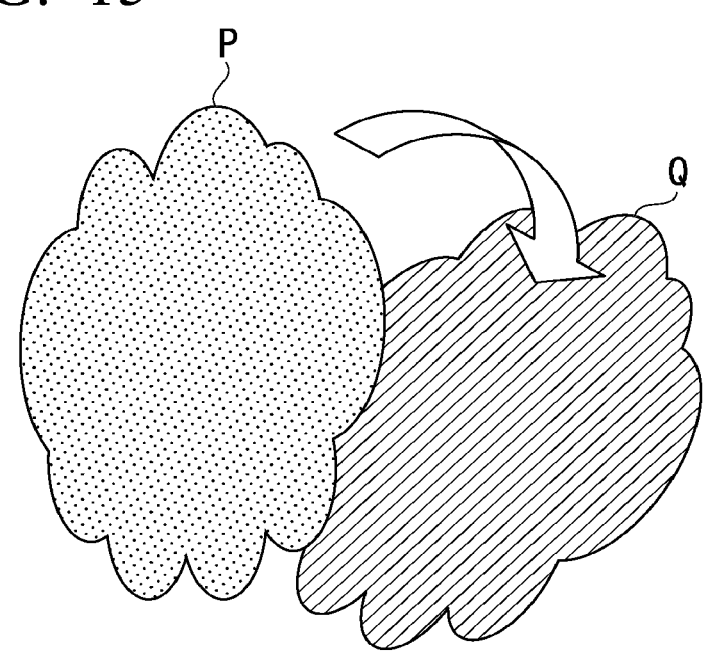
FIG. 15 is a diagram illustrating rotation/translation movement of a placement object point cloud.

FIG. 15 is a diagram illustrating rotation and translation of a placement object point cloud P.

The measurement information processing unit 330 recalculates error D on the basis of the determined R and t. In a case in which the error D is below a predetermined value Dmin, the measurement information processing unit 330 outputs the placement object point cloud P that has been rotated and translated as "position-matched placement object point cloud P' (a position-matched placement shape model P'). In a case in which the error D is equal to or larger than the predetermined value Dmin, the measurement information processing unit 330 sets the placement object point cloud P that has been rotated and translated as a new placement object point cloud P and repeats the process described above starting from determination of a pair of point clouds.

Figure 16:
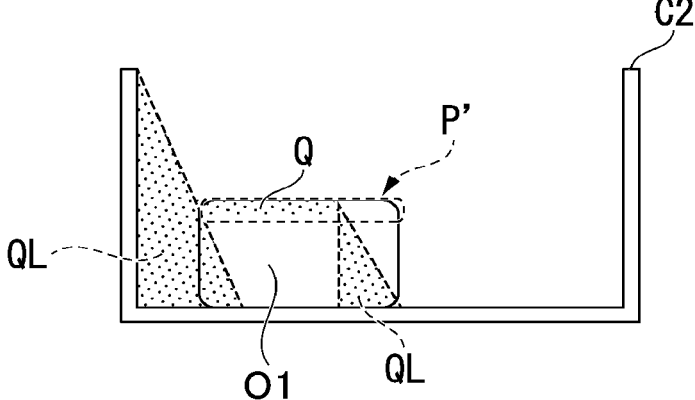
FIG. 16 is a diagram illustrating a position-matched placement object point cloud.
Figure 17:
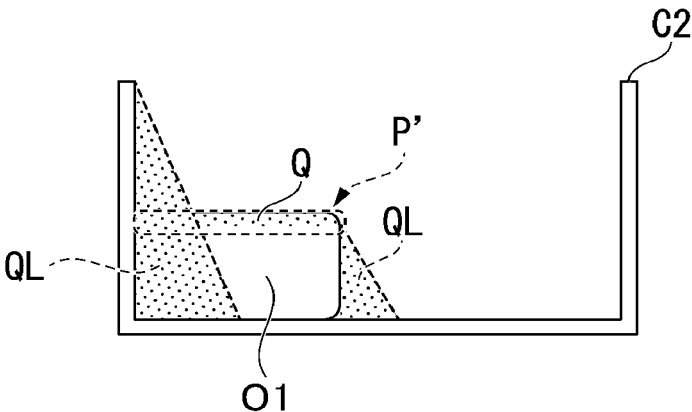
FIG. 17 is a diagram illustrating a position-matched placement object point cloud.

FIGS. 16 and 17 are diagrams illustrating a position-matched placement object point cloud P'.

In a case in which the position of the placement object point cloud P illustrated in FIG. 10 is matched for the differential point cloud Q illustrated in FIG. 8, in a case in which a degree of reliability is not used, the measurement information processing unit 330 cannot determine, for example, which one of the position-matched placement object point clouds P' illustrated in FIGS. 16 and 17 is an appropriate position-matched placement object point cloud P'. On the other hand, in a case in which the degree of reliability is used, a low degree of reliability that is not zero is assigned to points of a point cloud QL positioned at the blind spot (a non-sensing area) BR (see FIG. 11). The measurement information processing unit 330 performs position matching of each point Pi of the placement object point cloud P with respect to each point qi of the differential point cloud Q with the point cloud Q having a high degree of reliability prioritized first and points of a point cloud QL to which a low degree of reliability, which is not zero, is assigned, prioritized second. For this reason, the measurement information processing unit 330 can determine that the point cloud P' illustrated in FIG. 17 for which overlapping between the point cloud QL, of which a degree of reliability is low other than zero, and the differential point cloud Q is more than the point cloud P' illustrated in FIG. 16 is an appropriate position-matched placement object point cloud P1.

As illustrated in FIGS. 12 to 14, also in case in which measurement error occurs in measurement data of the measuring device 11, the measurement information processing unit 330 performs position matching with each point qi of the differential point cloud Q with a point having a high degree of reliability (a point having high measurement accuracy) being prioritized over a point having a low degree of reliability (a point having low measurement accuracy). For this reason, the measurement information processing unit 330 can generate a position-matched placement object point cloud P' of which measurement error has been reduced.

Figure 18:
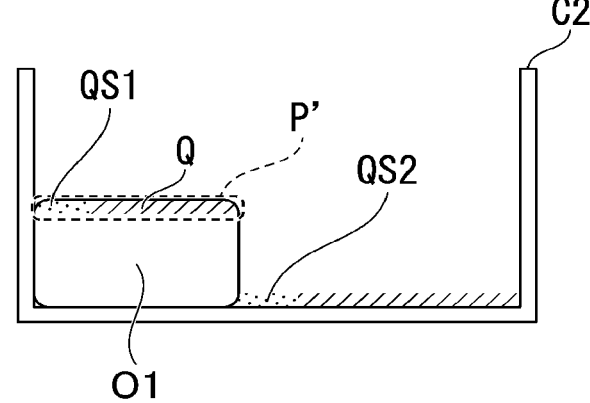
FIG. 18 is a diagram illustrating a complemented transfer destination shape.

FIG. 18 is a diagram illustrating a complemented transfer destination shape.

The measurement information processing unit 330 generates a complemented transfer destination shape acquired by complementing a transfer destination shape on the basis of the position-matched placement object point cloud P' in Step SB38. The measurement information processing unit 330 generates a complemented transfer destination shape acquired by complementing a transfer destination shape by regarding that the position-matched placement object point cloud P' output using a position matching process matches an actual position of the first object O1. For this reason, the complemented transfer destination shape is shape data of a transfer destination C2 with movement, deformation, and the like of the first object O1 after transfer of the first object O1 taken into account. In addition, the complemented transfer destination shape is shape data of the transfer destination C2 of which measurement error is reduced by complementing information of a part included in the blind spot (a non-sensing area) BR.

More specifically, the measurement information processing unit 330 causes a point cloud that is included in the position-matched placement object point cloud P' and is not included in the differential point cloud Q to be included in the point cloud of the complemented transfer destination shape as a first complemented point cloud QS1. In addition, the measurement information processing unit 330 identifies a blind spot (a non-sensing area) BR in accordance with the first object O1 on the basis of an actual position of the first object O1 calculated from the position of the position-matched placement object point cloud P' and causes a point cloud of the point cloud Q1 included in an area that becomes a blind spot (a non-sensing area) BR in accordance with the first object O1 to be included in a point cloud of the complemented transfer destination shape as a second complemented point cloud QS2.

[Operation of Planning Unit 340]

The planning unit 340 generates a placement plan on the basis of the complemented transfer destination shape generated by the measurement information processing unit 330. The planning unit 340, for example, generates a placement plan using a method described in Patent Document 2 or Patent Document 3. For example, the placement planning unit 343 of the planning unit 340 has measurement data relating to an object shape of an object O, an obstacle information of a transfer destination container C2, and a gripping plan (a gripping position and a gripping posture) generated by the gripping planning unit 341 as its inputs and calculates position candidates at the time of placement of the object O in the transfer destination container C2 and a priority level of each of the position candidates. The placement planning unit 343 calculates a target position of the handling device 10 at the time of arranging the object O in the transfer destination container C2 on the basis of the position candidates, the priority levels, and the measurement data relating to the object shape of the object O. The placement planning unit 343 outputs the target position of the handling device 10 at the time of arranging the object O in the transfer destination container C2 on the basis of the gripped object point cloud and the transfer destination shape generated by the measurement information processing unit 330. More specifically, the placement planning unit 343 forms the gripped object point cloud and the transfer destination shape as voxels. Subsequently, the placement planning unit 343 divides the inside of a transfer destination space into grids inside a horizontal plane and generates candidate points (combinations of x and y coordinates) of the object placement position. The placement planning unit 343 sets each placement position candidate as a horizontal position of the gripped object voxel and calculates a position of the gripped object voxel intersecting with the transfer destination voxel with the horizontal position being maintained. The calculation method thereof is similar to the method of calculating a falling position of the gripped object described above. The placement planning unit 343 calculates a priority level for the calculated placement position candidate (x, y, z). The method of calculating a priority level performs calculation as in Equation 10, for example, by considering that placement is performed with priority from a corner of the transfer destination container C2. Here, scores are priority levels, x, y, and z are coordinates of the placement position candidate, and a, b, and c are weight coefficients. After all the placement position candidates are calculated, the placement planning unit 343 sets a candidate having the highest priority level as the placement position of the object, calculates a target position of the handling device 10 on the basis of relative coordinates between the handling device 10 and the gripped object point cloud, and outputs the calculated target position.

$$\text{Score} = a*x + b*y + c*z \qquad \text{(Equation 10)}$$

[Operation of Plan Executing Unit 350]

By controlling the handling device 10 on the basis of a placement plan, the plan executing unit 350 performs a placement operation of a second object O2 (Step SD3). After performing the placement operation of the second object O2, the measurement information processing unit 330 stores the position of the second object O2 that has been actually arranged by the handling device 10 as a placement position calculation history 323.

According to the handling system 1, the control device 12, and the control program of this embodiment, also in a case in which a blind spot (a non-sensing area) BR is present in a container measured by the measuring device 11, on the basis of a history and a degree of reliability such as the placement position calculation history 323 and the like recorded in the recording unit 320, a complemented transfer destination shape acquired by complementing information included in the blind spot (a non-sensing area) BR can be generated. In addition, according to the handling system 1, the control device 12, and the control program of this embodiment, also in a case in which measurement error occurs in accordance with measurement accuracy of the measuring device 11, a complemented transfer destination shape acquired by complementing the measurement error on the basis of a degree of reliability calculated from the measurement accuracy can be generated. As a result, the handling system 1, the control device 12, and the control program according to this embodiment can accurately perceive the position of the transferred first object O1 on the basis of the generated complemented transfer destination shape and efficiently transfer a second object O2 to the transfer destination container C2 without any collision.

Second Embodiment

A second embodiment will be described with reference to FIG. 19.

A handling system 1B according to the second embodiment is a system similar to the handling system 1 according to the first embodiment and has a difference in the position matching process of Step SB37 from the handling system 1 according to the first embodiment.

Figure 19:
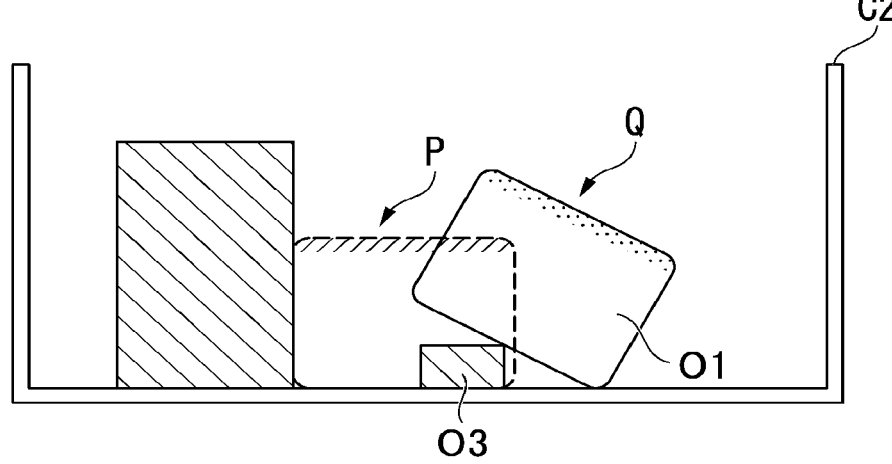
FIG. 19 is a diagram illustrating a load-collapsed first product determined by a handling system according to a second embodiment.

FIG. 19 is a diagram illustrating a load-collapsed first product O1.

As illustrated in FIG. 19, in a case in which a differential point cloud Q and a placement object point cloud P are separated by a predetermined distance or more, a measurement information processing unit 330 of a control device 12 determines that a load collapse occurs in the first product O1. In a case in which it is determined that a load collapse has occurred in the first product O1, the measurement information processing unit 330 does not perform a position matching process till the end. The measurement information processing unit 330, for example, may regard the differential point cloud Q generated on the basis of measurement data that has been actually measured as a position-matched placement object point cloud P'. In addition, the measurement information processing unit 330 may calculate a placement position of a next transfer object O such that the next object O is not disposed in a load collapse area in a next operation with an area in which a load collapse has occurred set as the load collapse area.

In a case in which the generated differential point cloud Q is small, the measurement information processing unit 330 of the control device 12 may determine that the transfer of the object O1 has failed. For example, in a case in which the number of points of the differential point cloud Q is smaller than a predetermined threshold used for determining a transfer failure, the measurement information processing unit 330 determines that the transfer of the first object O1 has failed and notifies an integration unit 300 of the transfer failure. The integration unit 300 that has received the notification may perform a process of stopping the operation of the handling device 10, urging an operator to perform checking, and the like.

The measurement information processing unit 330 of the control device 12 may store size information of a single object O and, in a case in which the generated differential point cloud Q is larger than the size of the single object O, determine that a plurality of objects O have been transferred in on transfer operation. For example, the measurement information processing unit 330 calculates a minimal rectangular parallelepiped including each point of the differential point cloud Q. The measurement information processing unit 330 compares the size of the calculated rectangular parallelepiped with the size information of the single object O and, when a size of any one side is equal to or larger than a predetermined value, determines that a plurality of objects O have been transferred, and notifies the integration unit 300 thereof. The integration unit 300 that has received the notification may perform a process of stopping the operation of the handling device 10, urging an operator to perform checking, and the like.

According to at least one of the embodiments described above, by using histories such as the placement position calculation history 323 and the like and a degree of reliability, the placement position and the like of the object O can be appropriately calculated by accurately perceiving the position of the transfer destination shape including the transferred object.

The present invention may be realized by recording the program according to the embodiment described above in a computer-readable recording medium and causing a computer system to read and execute the program recorded in this recording medium. The "computer system" described here includes an operating system (OS) and hardware such as peripherals.

Furthermore, the "computer-readable recording medium" represents a portable medium such as a flexible disk, a magneto-optical disk, a ROM, or a CD-ROM or a storage device such as a hard disk built into the computer system.

In addition, the "computer-readable recording medium" may include a medium dynamically storing the program for a short time such as a communication line in a case in which the program is transmitted via a network such as the Internet or a communication line such as a telephone line and a medium storing the program for a predetermined time such as a volatile memory inside a computer system serving as a server or a client in the case.

In addition, the program described above may be used for realizing some of the functions described above and may realize the functions described above in combination with a program that has already been recorded in the computer system.

A program operating a control device controlling a handling device configured to transfer an object from a transfer source space to a transfer destination space with the object gripped, a transfer destination measuring device configured to measure a transfer destination shape that is a shape of the transfer destination space, and an object measuring device configured to measure an object shape that is a shape of the object transferred by the handling device, the control program causing:

recording a measurement history of the transfer destination shapes acquired from the transfer destination measuring device, a calculation history of the placement positions of the object transferred into the transfer destination space, and a measurement history of the object shapes acquired from the object measuring device; and generating a complemented transfer destination shape acquired by complementing the transfer destination shape on the basis of the measurement history of the transfer destination shapes, the calculation history of the placement positions, and the measurement history of the object shapes.

A handling system comprising:

a handling device configured to transfer an object to a transfer destination space with the object gripped;

a transfer destination measuring device configured to measure a transfer destination shape that is a shape of the transfer destination space; and a control device configured to control the handling device and the transfer destination measuring device, wherein the control device:

records a measurement history of the transfer destination shapes acquired from the transfer destination measuring device and a calculation history of placement positions of the objects transferred to the transfer destination space; and generates a complemented transfer destination shape acquired by complementing the transfer destination shape on the basis of the measurement history of the transfer destination shapes and the calculation history of the placement positions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover the forms and modifications that fall within the scope and spirit of the inventions.

What is claimed is:

1. A handling system comprising:
a handling device configured to transfer an object from a transfer source space to a transfer destination space with the object gripped;
a transfer destination measuring device configured to measure a transfer destination shape that is a shape of the transfer destination space;
an object measuring device configured to measure an object shape that is a shape of the object transferred by the handling device; and
a control device configured to control the handling device and the transfer destination measuring device,
wherein the control device:
records a measurement history of the transfer destination shapes acquired from the transfer destination measuring device and a calculation history of placement positions of the objects transferred to the transfer destination space;
generates a complemented transfer destination shape acquired by complementing the transfer destination shape on the basis of the measurement history of the transfer destination shapes and the calculation history of the placement positions;
records a measurement history of the object shapes acquired from the object measuring device;
generates the complemented transfer destination shape on the basis of the measurement history of the object shapes in addition to the measurement history of the transfer destination shapes and the calculation history of the placement positions;
generates a placement shape model of the object transferred to the transfer destination space on the basis of the measurement history of the transfer destination shapes, the calculation history of the placement positions, and the measurement history of the object shapes;
generates the complemented transfer destination shape acquired by complementing the transfer destination shape using the placement shape model;
calculates a differential shape of the transfer destination shapes on the basis of the measurement history of the transfer destination shapes;
calculates an error between the differential shape and the placement shape model; and
generates the complemented transfer destination shape acquired by complementing the transfer destination shape by performing position matching of the placement shape model with respect to the differential shape such that the error decreases.

2. The handling system according to claim 1, wherein the control device translates or rotates the placement shape model such that the error decreases.

3. The handling system according to claim 1, wherein the control device:
assigns a degree of reliability to at least one of the differential shape and the placement shape model; and
generates the complemented transfer destination shape acquired by complementing the transfer destination shape using the degree of reliability.

4. The handling system according to claim 3, wherein the control device calculates the error that is weighted based on the degree of reliability.

5. The handling system according to claim 3, wherein the control device assumes that a non-measured part shape is positioned in a non-sensing area of the transfer destination measuring device in the transfer destination space and assigns a degree of reliability to the non-measured part shape that is lower than the degree of reliability assigned to the differential shape positioned in an area other than the non-sensing area.

6. The handling system according to claim 3, wherein the control device calculates the degree of reliability on the basis of measurement accuracy of the object measuring device.

7. The handling system according to claim 3, wherein the control device calculates the degree of reliability in correspondence with a degree of easiness in deformation of the object.

8. The handling system according to claim 1, wherein, in a case in which the differential shape and the placement shape model are separated from each other by a predetermined distance or more, the control device determines that a load collapse has occurred in the object.

9. The handling system according to claim 1, wherein, in a case in which a number of points of the differential shape is smaller than a predetermined threshold, the control device determines that transfer of the object has failed.

10. The handling system according to claim 1, wherein, in a case in which the differential shape is larger than a size of the single object in size, the control device determines that a plurality of objects have been transferred in one transfer operation.

11. A handling system, comprising:
a handling device configured to transfer an object from a transfer source space to a transfer destination space with the object gripped;
a transfer destination measuring device configured to measure a transfer destination shape that is a shape of the transfer destination space; and
a control device configured to control the handling device and the transfer destination measuring device,
wherein the control device:
records a measurement history of the transfer destination shapes acquired from the transfer destination measuring device and a calculation history of placement positions of the objects transferred to the transfer destination space; and
generates a complemented transfer destination shape acquired by complementing the transfer destination shape on the basis of the measurement history of the transfer destination shapes and the calculation history of the placement positions;
wherein, in a case in which a first object is transferred, the control device measures a first transfer destination shape of the transfer destination space before transfer of the first object and calculates a placement position of the first object to be transferred on the basis of the first transfer destination shape, wherein, in a case in which a second object is transferred after transfer of the first object, the control device measures a second transfer destination shape of the transfer destination space before transfer of the second object and generates a complemented transfer destination shape acquired by complementing the second transfer destination shape on the basis of the first transfer destination shape and the placement position of the first object, and wherein the control device:

generates a placement shape model of the first object transferred into the transfer destination space on the basis of the first transfer destination shape and the placement position of the first object;

calculates a differential shape between the first transfer destination shape and the second transfer destination shape;

calculates an error between the differential shape and the placement shape model; and generates the complemented transfer destination shape acquired by complementing the second transfer destination shape by performing position matching of the placement shape model with respect to the differential shape such that the error decreases.

12. The handling system according to claim 11, wherein the control device:

assigns a degree of reliability to at least one of the differential shape and the placement shape model; and calculates the error weighted based on the degree of reliability.

13. A control device controlling a handling device configured to transfer an object from a transfer source space to a transfer destination space with the object gripped, a transfer destination measuring device configured to measure a transfer destination shape that is a shape of the transfer destination space, and an object measuring device configured to measure an object shape that is a shape of the object transferred by the handling device, the control device comprising:

a recording unit configured to record a measurement history of the transfer destination shapes acquired from the transfer destination measuring device, a calculation history of placement positions of the object transferred into the transfer destination space, and a measurement history of the object shapes acquired from the object measuring device; and a measurement information processing unit configured to generate a complemented transfer destination shape acquired by complementing the transfer destination shape on the basis of the measurement history of the transfer destination shapes, the calculation history of the placement positions, and the measurement history of the object shapes, wherein the measurement information processing unit:

assigns a degree of reliability to at least any one of the transfer destination shape and the object shape;

generates the complemented transfer destination shape acquired by complementing the transfer destination shape using the degree of reliability;

generates a placement shape model of the object transferred into the transfer destination space on the basis of the calculation history of the placement positions and the measurement history of the object shapes;

calculates a differential shape of the transfer destination shape on the basis of the measurement history of the transfer destination shapes, and generates the complemented transfer destination shape acquired by complementing the transfer destination shape by performing position matching of the placement shape model with respect to the differential shape.

14. A control method for controlling a handling device configured to transfer an object from a transfer source space to a transfer destination space with the object gripped using measurement data acquired from a transfer destination measuring device configured to measure a transfer destination shape that is a shape of the transfer destination space and an object measuring device configured to measure an object shape that is a shape of the object transferred by the handling device, the control method comprising:

recording a measurement history of the transfer destination shapes acquired from the transfer destination measuring device, a calculation history of placement positions of the object transferred into the transfer destination space, and a measurement history of the object shapes acquired from the object measuring device;

generating a complemented transfer destination shape acquired by complementing the transfer destination shape on the basis of the measurement history of the transfer destination shapes, the calculation history of the placement positions, and the measurement history of the object shapes;

measuring an object shape that is a shape of the object transferred by the handling device;

recording a measurement history of the object shapes acquired from the object measuring device;

generating the complemented transfer destination shape on the basis of the measurement history of the object shapes in addition to the measurement history of the transfer destination shapes and the calculation history of the placement positions;

generating a placement shape model of the object transferred to the transfer destination space on the basis of the measurement history of the transfer destination shapes, the calculation history of the placement positions, and the measurement history of the object shapes;

generating the complemented transfer destination shape acquired by complementing the transfer destination shape using the placement shape model;

calculating a differential shape of the transfer destination shapes on the basis of the measurement history of the transfer destination shapes;

calculating an error between the differential shape and the placement shape model; and generating the complemented transfer destination shape acquired by complementing the transfer destination shape by performing position matching of the placement shape model with respect to the differential shape such that the error decreases.

15. A non-transitory computer readable medium storing a program for causing a computer to execute the control method according to claim 14.

* * * * *